(12) United States Patent
Schmidt-Sunnus et al.

(10) Patent No.: US 12,435,832 B2
(45) Date of Patent: Oct. 7, 2025

(54) HOLDING STRUCTURE

(71) Applicant: Vibracoustic SE, Darmstadt (DE)

(72) Inventors: Rainer Schmidt-Sunnus, Lübeck (DE); David Rose, Hamburg (DE); Steffen Nitschke, Hamburg (DE); Philipp Werner, Lüneburg (DE); Daniel Renz, Lüneburg (DE)

(73) Assignee: Vibracoustic SE, Darmstadt (DE)

( * ) Notice: Subject to any disclaimer, the term of this patent is extended or adjusted under 35 U.S.C. 154(b) by 127 days.

(21) Appl. No.: 18/370,504

(22) Filed: Sep. 20, 2023

(65) Prior Publication Data

US 2024/0093828 A1 Mar. 21, 2024

(30) Foreign Application Priority Data

Sep. 20, 2022 (DE) .................. 10 2022 124 154.8

(51) Int. Cl.
*F16M 13/00* (2006.01)
*F16M 13/02* (2006.01)

(52) U.S. Cl.
CPC .................................. *F16M 13/02* (2013.01)

(58) Field of Classification Search
None
See application file for complete search history.

(56) References Cited

U.S. PATENT DOCUMENTS

| | | | | |
|---|---|---|---|---|
| 5,711,513 A * | 1/1998 | Bretaudeau | ............. | F16F 13/14 |
| | | | | 267/293 |
| 10,232,697 B2 * | 3/2019 | Hara | ........................ | B60K 1/04 |
| 2013/0199024 A1 | 8/2013 | Grumberg | | |
| 2020/0079201 A1 * | 3/2020 | Suzuki | ...................... | B60K 1/00 |
| 2020/0220125 A1 * | 7/2020 | Caliskan | ............. | H01M 50/249 |
| 2020/0227705 A1 * | 7/2020 | Grace | ................... | B60L 3/0007 |
| 2021/0387534 A1 | 12/2021 | Sjöholm | | |
| 2023/0391419 A1 * | 12/2023 | Schwenk | ................. | B62M 6/55 |
| 2024/0151159 A1 * | 5/2024 | Levisse | ................. | F01D 25/162 |

FOREIGN PATENT DOCUMENTS

| | | |
|---|---|---|
| AT | 519558 A4 | 8/2018 |
| DE | 202015104233 U1 | 9/2015 |
| DE | 102020200329 A1 | 7/2021 |
| EP | 4272986 A1 | 11/2023 |
| WO | 2018134210 A1 | 7/2018 |
| WO | 2022106111 A1 | 5/2022 |

OTHER PUBLICATIONS

German Search Report, DE102022124154.8, dated Apr. 27, 2023 (w_English_translation).
Machine English translation for WO2018134210A1.
Extended European Search Report, EP23198373, dated Mar. 6, 2024 (w_translation).

\* cited by examiner

*Primary Examiner* — Steven M Marsh
(74) *Attorney, Agent, or Firm* — Fishman Stewart PLLC

(57) ABSTRACT

An embodiment of a holding structure includes at least one receiving eye with a central receiving axis; at least two fixing points, with each fixing point having a fixing axis that runs parallel to the at least one receiving axis; a first wall and a second wall provided on opposite sides of the holding structure. In embodiments the first wall and the second wall are spaced apart in the direction of the at least one receiving axis; the at least one receiving eye extends from one of the two walls to the other wall; and the holding structure has at least one cavity that is provided between the first wall and the second wall.

20 Claims, 7 Drawing Sheets

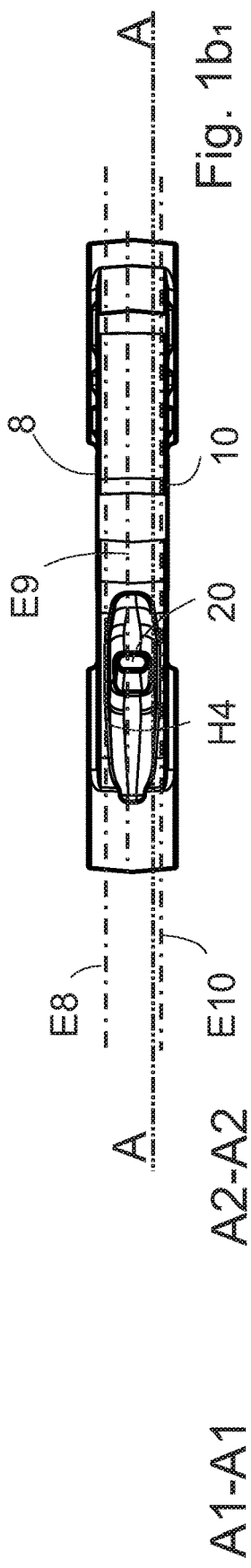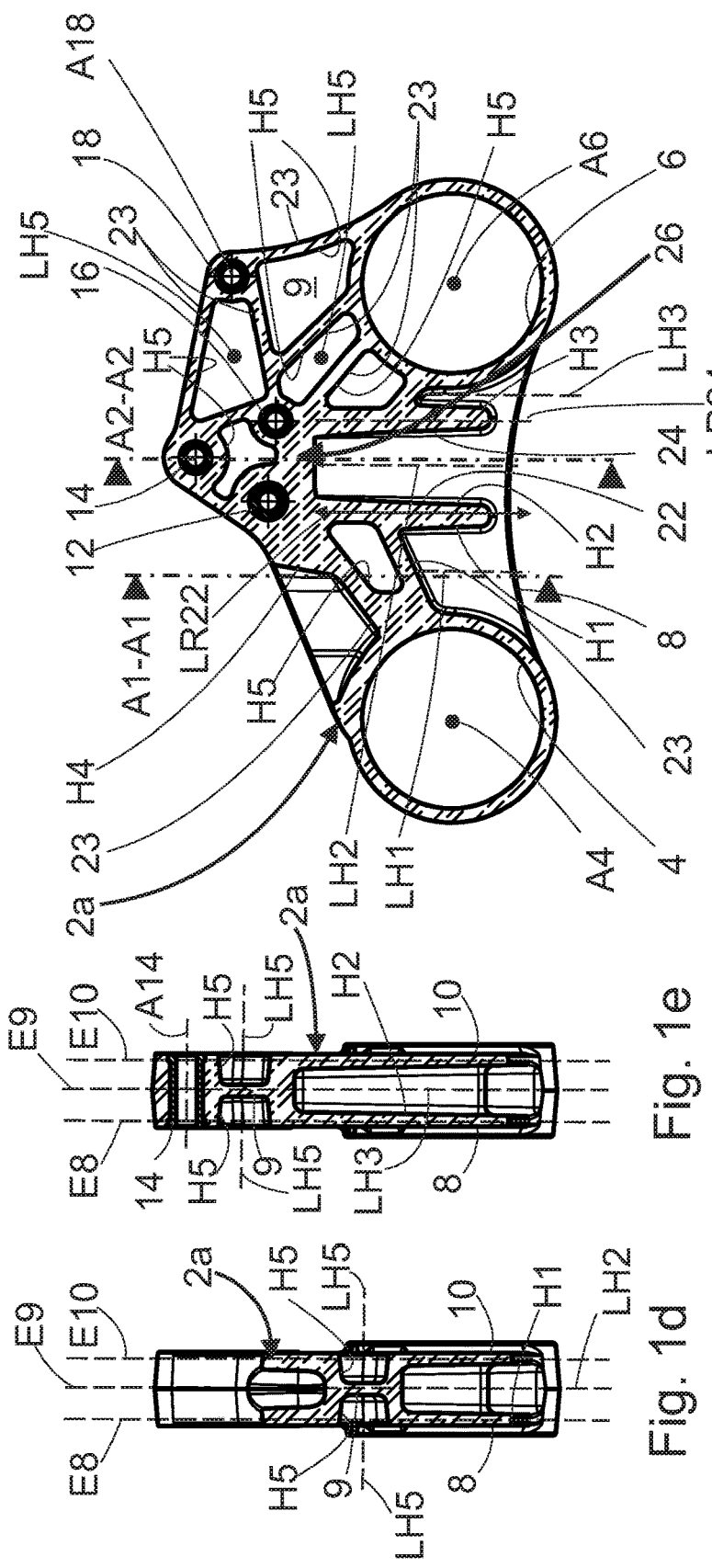

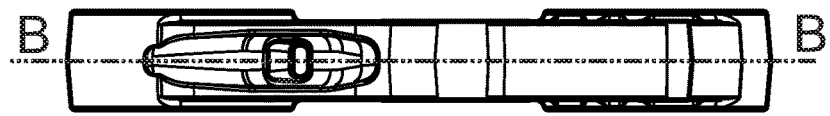
Fig. 1b₂
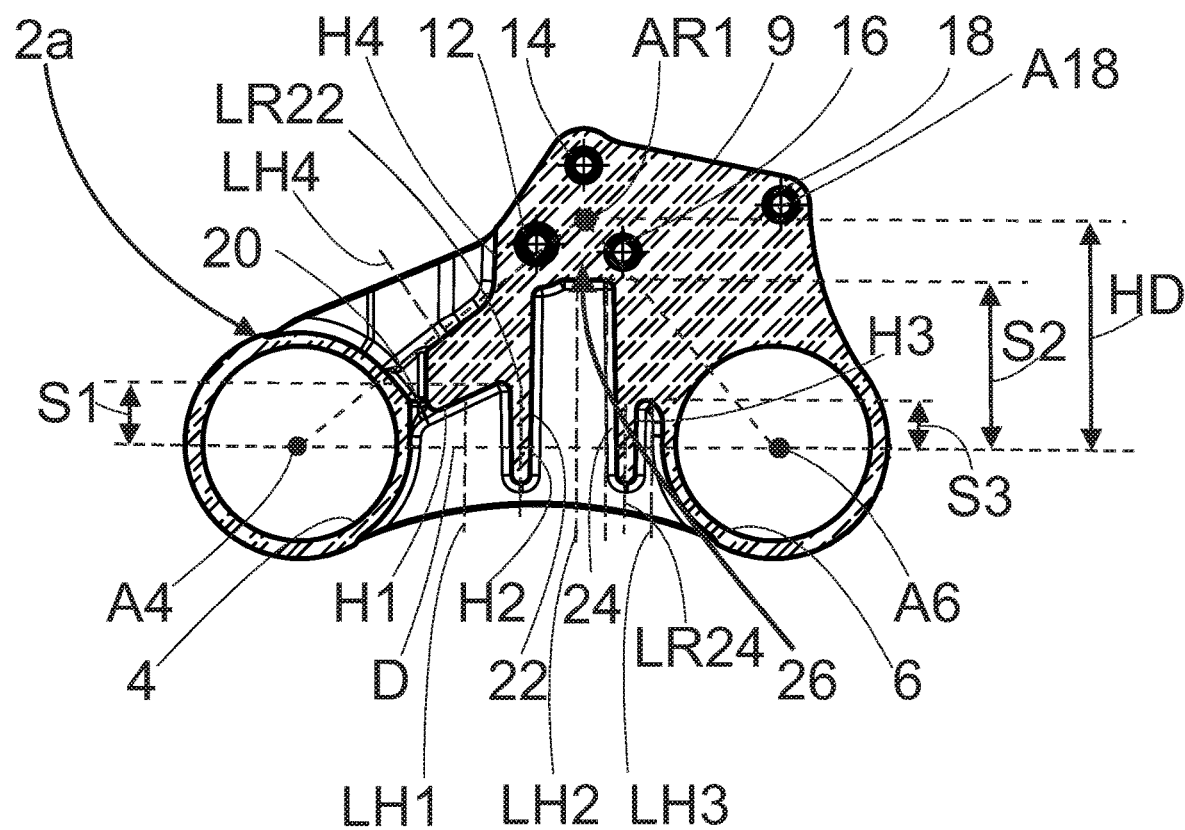
B-B  Fig. 1f

HOLDING STRUCTURE

CROSS-REFERENCE TO RELATED APPLICATION

This application claims priority to German Patent Application No. DE 10 2022 124 154.8, filed on Sep. 20, 2022, the contents of which is hereby incorporated by reference in its entirety.

TECHNICAL FIELD

The invention relates to a holding structure.

BACKGROUND

Holding structures are known in practice which hold components, for example sensitive assemblies, in motor vehicles and, for example, fix the same to the vehicle frame structure. For example, large batteries for the electric mobility of trucks have a large inherent weight. Their vibrational decoupling from the bodywork places a great demand on elastomer bearings which are used in the holding structure, for example in receiving eyes. Frequently, therefore, use is made of elastomer bearings of large diameter, which are capable of compensating for large travels which, for example, can occur during the twisting of the vehicle frame structure.

However, such large elastomer bearings also necessarily require correspondingly large receiving eyes. In order to not weaken the surrounding attachment structures, for example a vehicle frame structure, by means of the necessary large receiving eyes but also to achieve a greater stylistic freedom in the geometric arrangement of the bearing points between the elastomer bearings and the component to be supported in the space, specific bearing receiving structures can be used as additional elements. These have at least one large receiving eye for at least one elastomer bearing, and at least two screw connection points, at which the bearing receiving structure is attached to the load-bearing surrounding attachment structure, for example a vehicle frame structure.

Depending on the geometric arrangement of the screw connection points in relation to the at least one elastomer bearing receiving eye or to the plurality of elastomer bearing receiving eyes, large bending moments are produced at different points of the bearing receiving structure in the plane perpendicular to through holes in the core of the elastomer bearings, through which the screw fixings are guided. In order to achieve the highest possible flexural rigidity of the bearing receptacles in the most highly loaded areas, as much material as possible is usually concentrated in this plane. At the same time, however, forces perpendicular to this plane lead to its deflection or twisting.

However, known bearing receiving structures are not configured in such a way that they are sufficiently resistant to bending and twisting as a result of economical production with a low weight.

SUMMARY

Among other things, the invention deals with the improvement of the aforementioned prior art.

Aspects and features of the invention are disclosed herein.

According to embodiments of the invention, a holding structure is proposed, comprising at least one receiving eye which has a central receiving axis, at least two fixing points, which each have a central fixing axis which runs parallel to the at least one receiving axis, a first wall and a second wall, which are arranged on opposite sides of the holding structure, the two walls being spaced apart in the direction of the at least one receiving axis, wherein the at least one receiving eye extends from one of the walls to the other wall, wherein the holding structure additionally has at least one cavity, which is arranged between the walls.

The holding structure according to embodiments of the invention has a geometry which can be produced economically, for example the holding structure can be produced by means of a casting process. In addition, the holding structure according to the invention permits only small deflections on account of forces acting axially and radially on an insertable elastomer bearing, not least because of the walls and the arrangement of the axes. In particular, the holding structure according to the invention exhibits high flexural rigidity and also high torsional stiffness. The latter stiffness is required for the case in which cardanic moments are introduced into an elastomer bearing that can be inserted. Cardanic moments are the most critical around the axis/the sections which connect the insertable elastomer bearing to the fixing point(s) on the shortest path.

In order to secure the holding structure against rotation relative to an attachment structure, for example with respect to a vehicle frame structure to which the holding structure can be fixed, this can be fixable, for example fixable by screwing, via at least two fixing points. Therefore, the holding structure comprises at least two fixing points. One fixing point can be a through hole in the holding structure. It can be limited by a cylindrical section, which is formed of the material of the holding structure. However, the fixing point can also be a fixing sleeve with a through hole, wherein its material can be different from the material of the holding structure.

Furthermore, the holding structure has at least one receiving eye, into which an elastomer bearing can be inserted. The receiving eye can be continuous.

As a result of this configuration according to the invention, radial loads in the insertable elastomer bearing can be transmitted in a suitable way to the fixing points. In particular, bending moments are transmitted, that is to say moments about the axial direction of the at least one receiving axis and the at least two fixing axes. The two walls are used for this purpose, in order to transmit bending moments about the at least one receiving axis. In order specifically to be able to transmit the highest possible bending moments in a plane parallel or identical to at least one of the walls, as many two-dimensional structures as possible can be arranged in the plane and parallel thereto. Therefore, the axially spaced walls are used for the transmission of such bending moments. This geometric relationship can also be described by the normal vector to the respective plane or the plane in which the respective wall extends (wall plane) running parallel to the fixing axes and the at least one receiving axis. The plane in which one wall or an inner wall lies can be designated as a wall plane.

The holding structure according to the invention is suitable not only for the transmission of high bending moments in a plane parallel or identical to at least one of the walls, at the same time it can also be produced economically with minimum material use. The geometry according to the invention specifically permits production by means of a casting process, in which sliders can project into a casting mold in order to produce the cavities to reduce material.

According to a conceivable refinement of the holding structure according to the invention, the at least one cavity is delimited by both walls. It can therefore be designated as a wall cavity. The wall cavity can have a longitudinal direction along its course. This longitudinal direction can run parallel to the wall(s) and/or inner wall. The wall cavity can be open to the surroundings of the holding structure on at least one side. This open side is not located within a wall; instead the wall cavity can open in the intermediate area of the two walls.

According to a conceivable refinement of the holding structure according to the invention, the two walls are arranged on the outside of the holding structure. They can therefore also be designated as outer walls. As a result, they can be spaced apart as widely as possible in the axial direction, in order to produce well-balanced rigidities about the various axes.

According to a conceivable refinement of the holding structure according to the invention, an inner wall can be arranged between the walls, running parallel to at least one of the two walls. As a result, even three walls or two-dimensional structures can be formed, the respective planes of which, in which they are arranged, can all run perpendicularly from the fixing axes and the at least one receiving axis. This leads to a high rigidity against bending moments about the at least one receiving axis.

According to a conceivable refinement of the holding structure according to the invention, the walls and/or the inner wall are flat and extend in a respective plane. As a result, the bending moments can be transmitted as best as possible in the respective wall.

According to a conceivable refinement of the holding structure according to the invention, the respective planes (wall planes) in which the walls or the walls and the inner wall extend are parallel to one another. As a result, the bending moments can be transmitted as best as possible in the walls.

According to a conceivable refinement of the holding structure according to the invention, respective planes (wall planes) in which the walls extend are angled relative to one another, wherein they can enclose an angle in the range from 0.1 to 20°. An angle enclosed between a wall and the inner wall can have half the angle size. As a result, it is possible to devise a holding structure which can be adapted to installation space limits and/or can further save material as a result of the basically obliquely tapering shape.

According to a conceivable refinement of the holding structure according to the invention, the latter can comprise a plurality of receiving eyes, wherein the receiving axes of all the receiving eyes can run parallel to one another. This refinement indicates the potential of the invention, so that even large and/or different bending moments which are input by elastomer bearings which can be inserted in the receiving eyes can be transmitted safely and permanently.

According to a further refinement of the holding structure according to the invention, at least one rib, preferably a plurality of ribs, can be arranged between the walls. The at least one rib can connect the two walls directly or rectilinearly indirectly to one another via the inner wall. The at least one rib can have a longitudinal direction along its course, preferably parallel to at least one of the walls. The at least one rib can have an extent in the direction of the at least one receiving axis which is greater than an extent in a direction which is transverse thereto and to its longitudinal direction. The at least one rib can lie in a plane or rib plane which is aligned at right angles to the plane(s) or wall plane of the wall(s) or in addition the inner wall. As a result, it forms a structure which can be arranged at right angles to the walls in order to connect the latter stably to each other, in particular counter to forces transverse to the wall planes.

According to a conceivable refinement of the holding structure according to the invention, the at least one rib can have a straight course. In this way, the corresponding rib can make a significant contribution to the stiffness of the holding structure in its longitudinal direction.

According to a conceivable refinement of the holding structure according to the invention, the at least one rib can run congruently with or parallel to a connecting section of the connecting triangle. This rib can be designated as a direct connecting rib. The rib or direct connecting rib connects force introduction points directly to one another. The less the rib(s) is/are arranged to deviate in relation to the force introduction points or the connecting section, the less twisting is induced.

According to a further refinement of the holding structure according to the invention, three axes, selected from the group comprising receiving axis/axes, fixing axes and resultant fixing axis, can define at least one connecting triangle, wherein the at least one cavity can project into the connecting triangle, preferably can project in a direction which is perpendicular to the at least one receiving axis. The connecting triangle is an imaginary geometric shape. It is conceivable that the group comprises at least one receiving axis, preferably two receiving axes. As it projects in, the corresponding cavity can project through at least one side of the connecting triangle. The longitudinal direction of the cavity can run parallel to at least one wall plane.

The receiving axis/axes and the fixing axes can be connected geometrically by means of connecting sections. In each case, three connecting sections can thus form the connecting triangle. Preferably, the connecting triangle lies in a plane parallel to at least one wall/inner wall or even lies in a wall/inner wall or the respective wall plane.

A resultant fixing axis results as the geometric center of a group of individual fixing axes of the respective fixing points. A plurality of fixing points can form a fixing group. A fixing group can comprise either exactly three or exactly two fixing points.

In the case of three fixing points, these are spaced apart from one another in such a way that their fixing axes define a triangle or fixing group triangle. In the fixing group triangle, the shortest side length can be at least 80% of the longest side length. Additionally or alternatively, none of the three side lengths is longer than 100 mm. The geometric center which results can be the center of gravity of the fixing group triangle in the mathematical sense.

In the case of a fixing group made of exactly two fixing points, the distance between the respective fixing axes can be a maximum of 100 mm. The geometric center which results can be the center of a connecting straight line between the exactly two fixing axes.

For the case in which the holding structure has exactly one receiving axis and exactly two fixing axes, the two fixing axes do not form a resultant fixing axis since, in this case, no connecting triangle would be definable. It is entirely conceivable that a fixing point can be included in different fixing groups, if it satisfies the above criteria of the fixing group.

A connecting triangle can be formed, for example, between two fixing axes or two resultant fixing axes and a receiving axis. However, it can, for example, also be formed between a fixing axis or a resultant fixing axis and two receiving axes.

Since the cavity projects into the connecting triangle, a deep penetration can be implemented, which leads to a considerable material saving without any detrimental influences on the stability. Surprisingly, such cavities lead to a holding structure which not only exhibits a high flexural rigidity (as a result of radial loads in elastomer bearing(s)) in the wall plane(s) but also leads to a particularly well-balanced ratio of small deformations on account of loads in the axial direction having different signs (=high torsional and twisting rigidities) and low deformations on account of loads in the axial direction with the same signs (=high flexural rigidities perpendicular to the shell plane).

According to a further refinement of the holding structure according to the invention, the penetration distance over which the at least one cavity projects into the connecting triangle can lie in the region of 1.0 times to 0.1 times the height of the connecting triangle, preferably in the range of 0.9 times to 0.1 times the height, more preferably in the range of 0.9 times to 0.5 times the height. The height of the connecting triangle is defined via that side of the connecting triangle through which the cavity projects. As a result, deep cavities can be quantified.

According to a further refinement of the holding structure according to the invention, at least one of the fixing points, preferably a majority of the fixing points, still more preferably all of the fixing points, can be carried by both walls or attached thereto. Preferably, a cavity, preferably a wall cavity, at least one fixing point/one fixing group extends in such a way that, at least in the direction of a connecting section, both walls can merge into the fixing point. This makes a particularly torsionally rigid attachment of the fixing point to the holding structure possible, wherein the torsional direction about the axial direction, that is to say torsion in or parallel to at least one wall plane, becomes relevant.

According to a further refinement of the holding structure according to the invention, it can comprise at least one drain opening, which is connected fluidically to at least one of the cavities and leads to the surroundings of the holding structure or to another of the cavities. This prevents the cavities acting in a scooping manner during operation, which can lead to frost damage as they freeze as a result of expansion resulting from ice crystal formation. Instead, water, for example rainwater or spray water, can flow away through the holding structure under gravity. Thus, damage to the holding structure resulting from freezing of the water is avoided. It is conceivable that the drain opening is formed by the inner wall. Because of its central arrangement, fluid can therefore advantageously be guided into the center. It is conceivable that the drain opening has a tapering course along its longitudinal direction. As a result, it can guide accumulating fluid as best as possible in the manner of a funnel.

According to a further refinement of the holding structure according to the invention, the at least one rib can be arranged in such a way that it separates at least two of the cavities in the interior of the connecting triangle and separates at least two of the cavities outside the connecting triangle. Alternatively, the at least one rib can be arranged in such a way that it separates two of the cavities in the interior of the connecting triangle and these cavities also outside the connecting triangle. The more ribs are provided between the walls, the more twist-resistant is the holding structure but it can become correspondingly heavier as a result.

According to a conceivable refinement of the holding structure according to the invention, this comprises at least one further cavity, which is delimited at the front by one of the walls or the inner wall and is open to the surroundings of the holding structure on at least one side, wherein this open side is located in one of the two walls. The open side can lie opposite the walls or the inner wall. If one of the walls forms the closed front side, this wall does not also form the open side but the other of the walls. The longitudinal direction of this cavity along its course is thus aligned perpendicular or substantially perpendicular to at least one wall plane. The cavity can be designated as a traversing cavity. The longitudinal direction of the traversing cavity or the traversing cavities can advantageously be aligned at right angles to the longitudinal direction of the wall cavity or the wall cavities. As a result, it is possible to form cavities (wall cavity and traversing cavity) in the holding structure which project into the holding structure from different spatial directions, in particular to reduce material.

According to a conceivable refinement of the holding structure according to the invention, at least two traversing cavities can be located opposite with respect to the inner wall. The more mirror-symmetrical the holding structure is to an overall central plane or the inner wall, the fewer bending moments are induced in the holding structure by radial loads (which can be introduced into the receiving eyes or fixing points).

According to a conceivable refinement of the holding structure according to the invention, this is mirror-symmetrical with respect to the inner wall. The inner wall is then advantageously arranged centrally, as a result of which more rigidity is produced.

According to a conceivable refinement of the holding structure according to the invention, a rib can separate a wall cavity from a traversing cavity. Thus, local rigidity requirements on the holding structure can be implemented constructively as best as possible.

According to a further refinement of the holding structure according to the invention, the at least one rib can project beyond the longest side of the connecting triangle. In this way, the torsional rigidity about the longest of the three sides of the connecting triangle is increased. Since this involves the longest of the three sides of the connecting triangle, a structure in the region of this longest side is more flexible with respect to the torsional rigidity than in regions of the two other sides, so that a reinforcement may be particularly advantageous. Particularly advantageously, a plurality of ribs project beyond the longest of the three sides of the connecting triangle.

According to a further refinement of the holding structure according to the invention, the at least one rib can be arranged in such a way that it extends in the direction of one of the fixing points or of a fixing group formed by fixing points. As a result of this arrangement, bending moments which traverse at least one wall plane can be absorbed particularly well.

According to a further refinement of the holding structure according to the invention, it can be designed in one piece, preferably as a casting, or from a one-piece part having at least two fixing sleeves. It can be producible as a casting, for example by aluminum die casting or injection molding. Advantageous in this regard is the possibility of the use of so-called sliders, which can project into the casting mold in order to produce the cavities. As a result, it is possible to use transverse sliders which form the traversing cavities and wall sliders which form the wall cavities. It is also conceivable that no transverse sliders are used for the traversing cavities, instead the respective geometry is depicted by the casting mold itself.

BRIEF DESCRIPTION OF THE DRAWINGS

Further features, details and advantages of the invention can be gathered from the wording of the claims and from the following description of exemplary embodiments with reference to the drawing, in which:

FIG. 1b1 shows a top view of the holding structure according to FIG. 1a,

FIG. 1b2 shows a top view of the holding structure according to FIG. 1a,

FIG. 1c shows a sectional view through the holding structure according to FIG. 1a along the line A-A according to FIG. 1b1, FIG. 1d shows a sectional view through the holding structure according to FIG. 1a along the line A1-A1 according to FIG. 1c, FIG. 1e shows a sectional view through the holding structure according to FIG. 1a along the line A2-A2 according to FIG. 1c, FIG. 1f shows a sectional view through the holding structure according to FIG. 1a along the line B-B according to FIG. 1b2.

FIG. 2b shows a top view of the holding structure according to FIG. 2a,

FIG. 3b shows a top view of the holding structure according to FIG. 3a,

DETAILED DESCRIPTION

In the figures, the same or mutually corresponding elements are each provided with the same designations and will therefore not be described again, if not expedient. Features that have already been described will not be described again in order to avoid repetitions and are able to be applied to all elements having the same or mutually corresponding designations, if not explicitly ruled out. The disclosures contained in the entire description can be transferred with the same effect to the same parts with the same designations or the same component designations. In addition, the positional information chosen in the description, such as, for example, above, below, at the side and so on, is based on the directly described and illustrated figure and are to be transferred with the same effect to the new position in the event of a position change. Furthermore, individual features or feature combinations of the different exemplary embodiments shown and described can also constitute solutions that are self-contained, innovative or inventive.

Figure 1A:
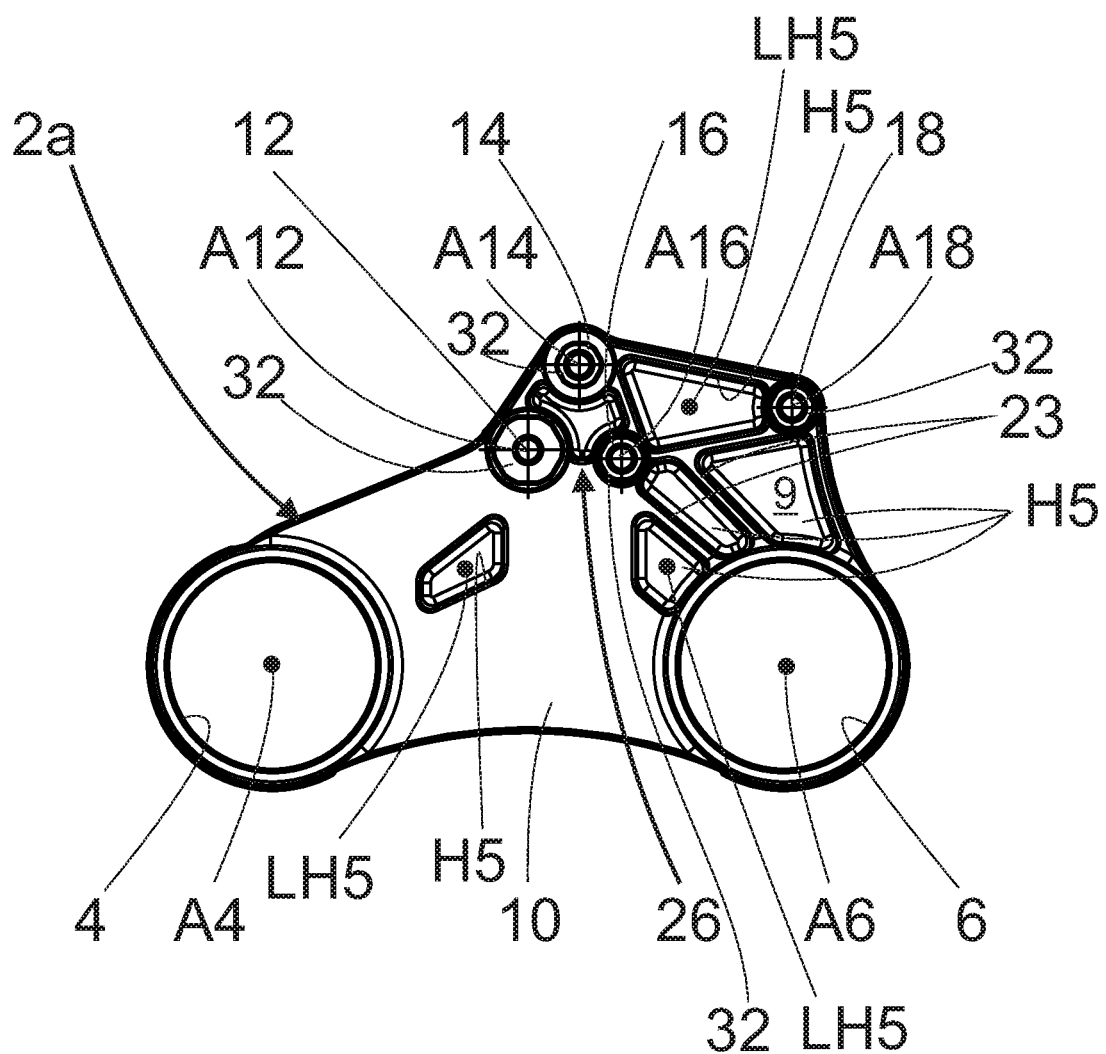
FIG. 1a shows a side view of a holding structure according to the invention in a first embodiment.
Figure 2A:
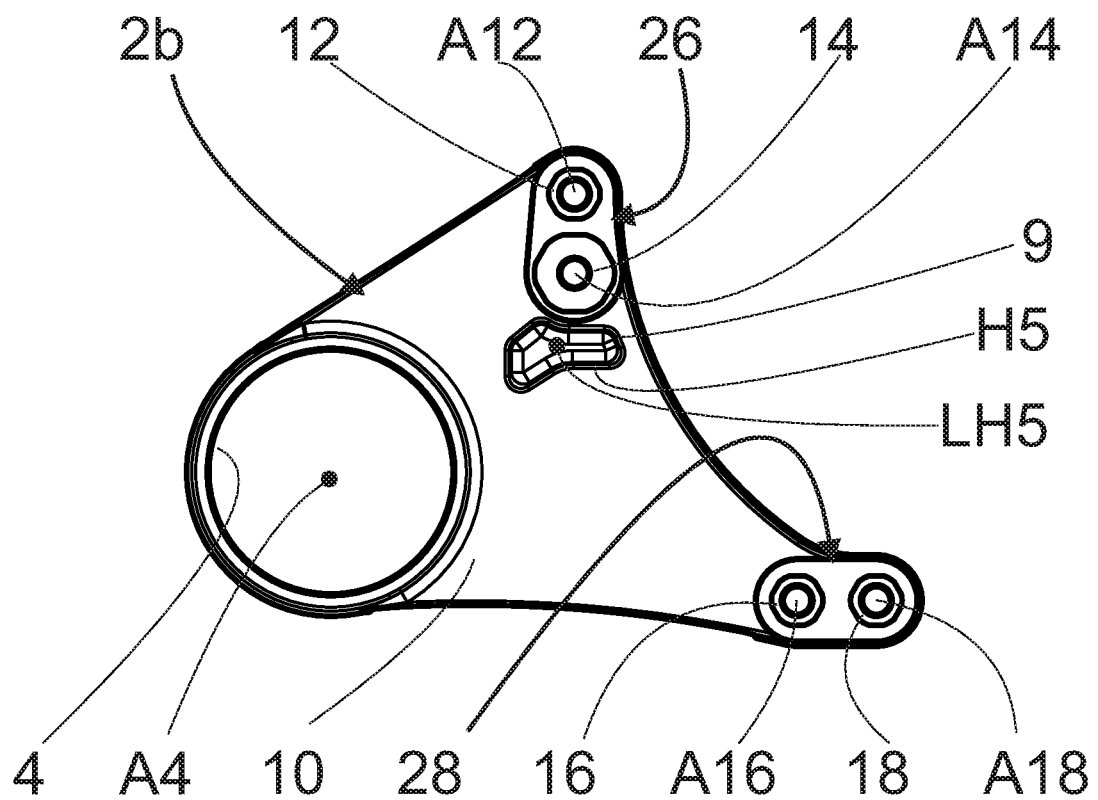
FIG. 2a shows a side view of a holding structure according to the invention in a second embodiment.
Figure 2B:
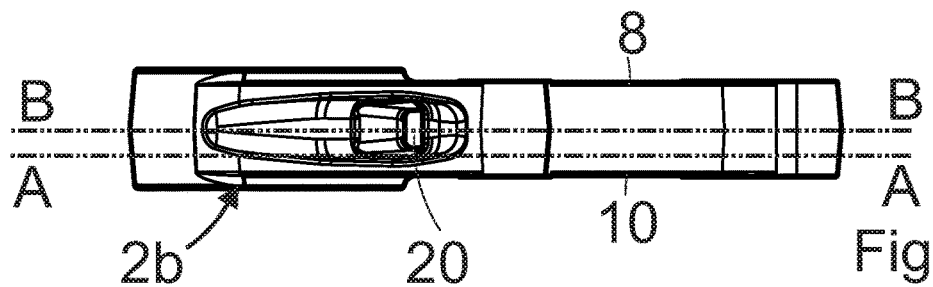
Figure 2C:
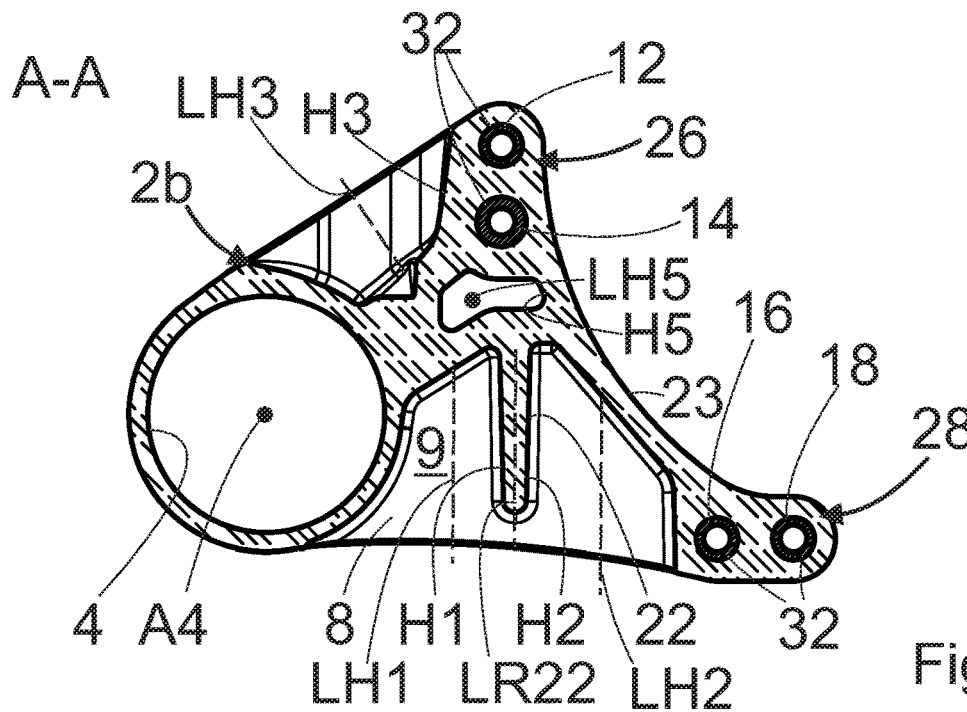
FIG. 2c shows a sectional view through the holding structure according to FIG. 2a along the line A-A according to FIG. 2b.
Figure 2D:
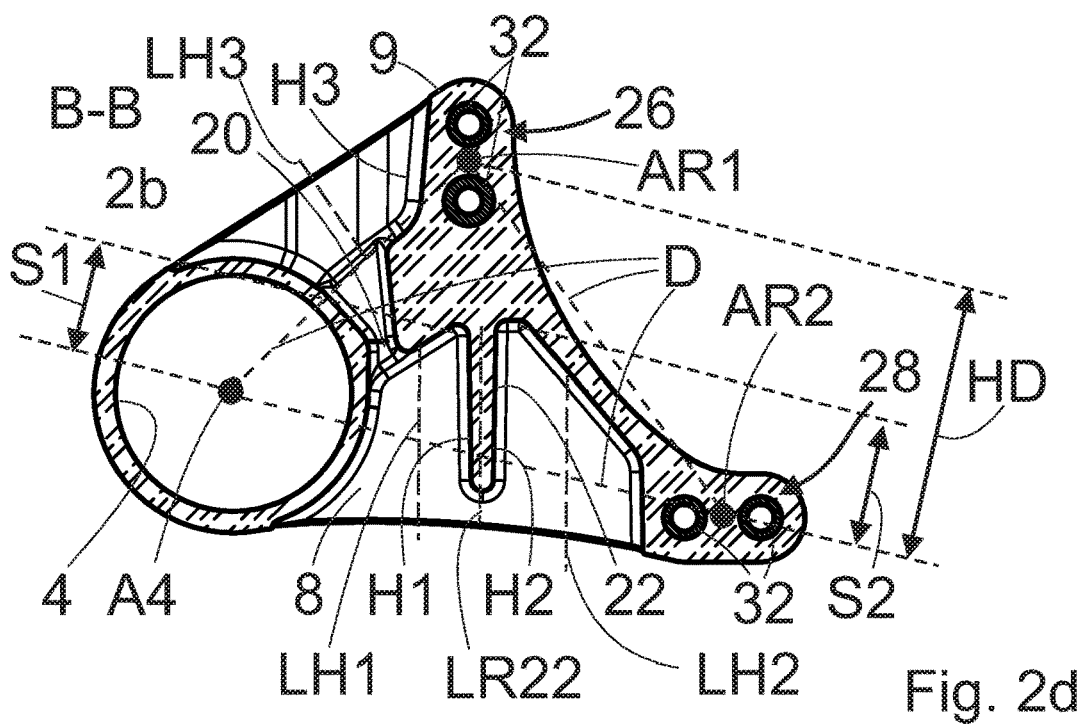
FIG. 2d shows a sectional view through the holding structure according to FIG. 2a along the line B-B according to FIG. 2b.
Figure 3A:
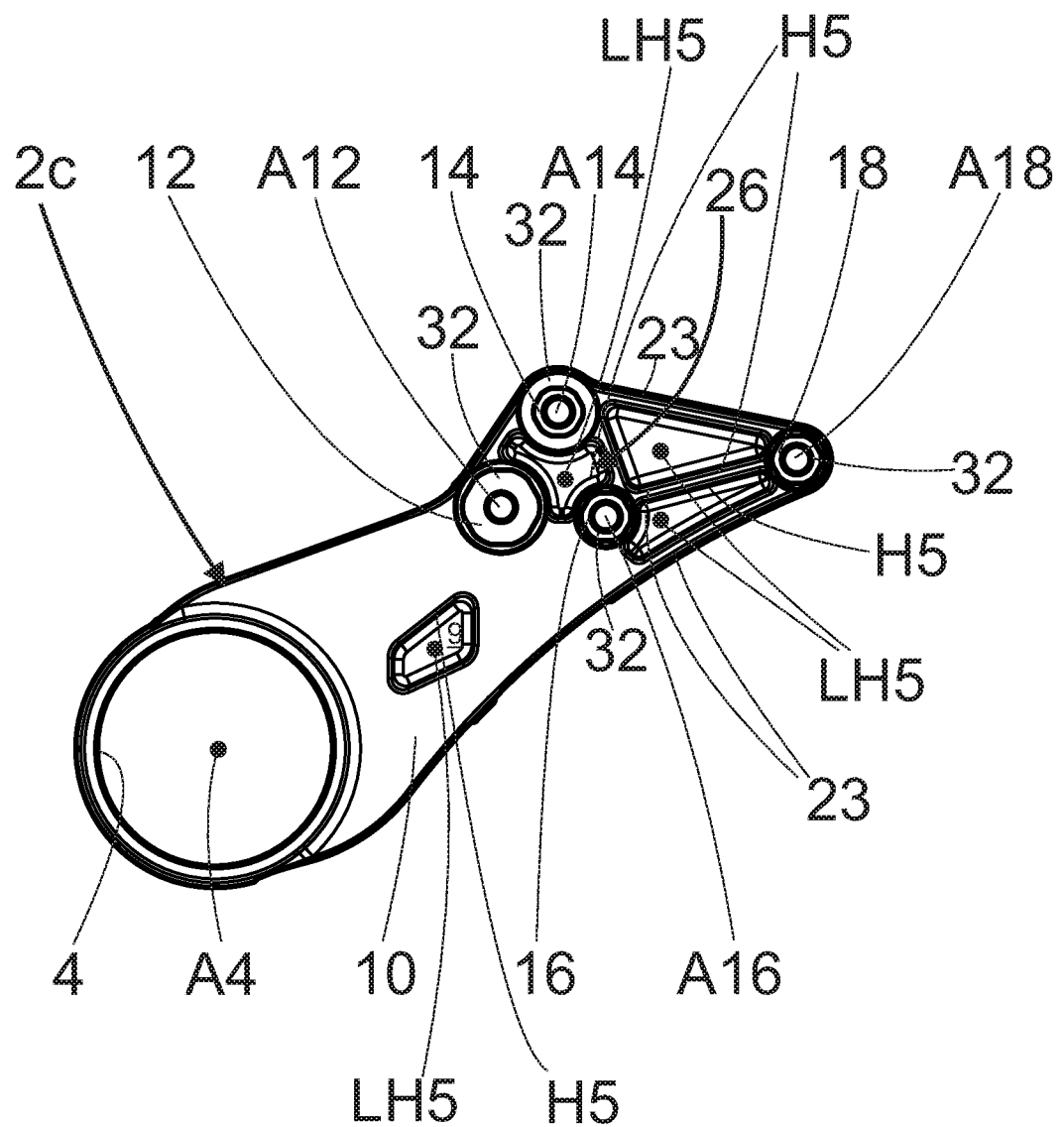
FIG. 3a shows a side view of a holding structure according to the invention in a third embodiment.
Figure 3B:
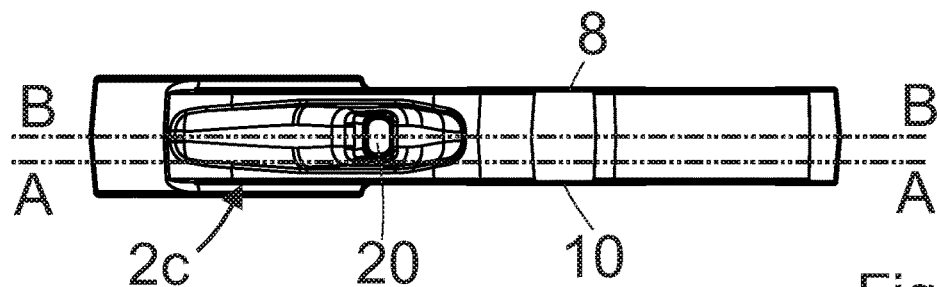
Figure 3C:
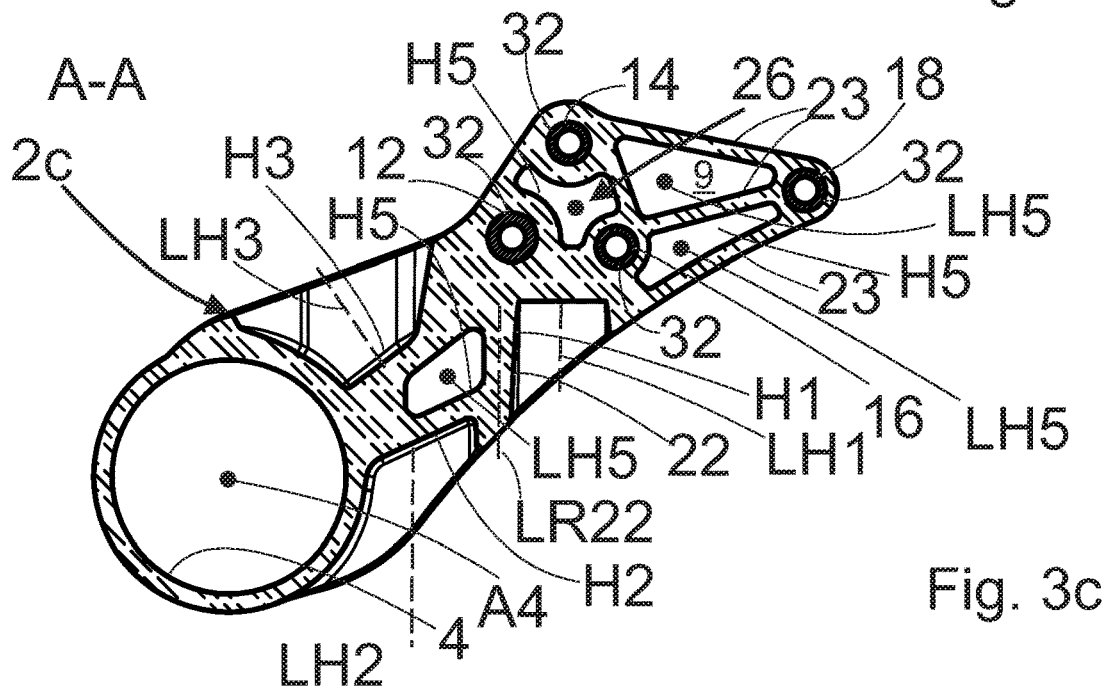
FIG. 3c shows a sectional view through the holding structure according to FIG. 3a along the line A-A according to FIG. 3b.
Figure 3D:
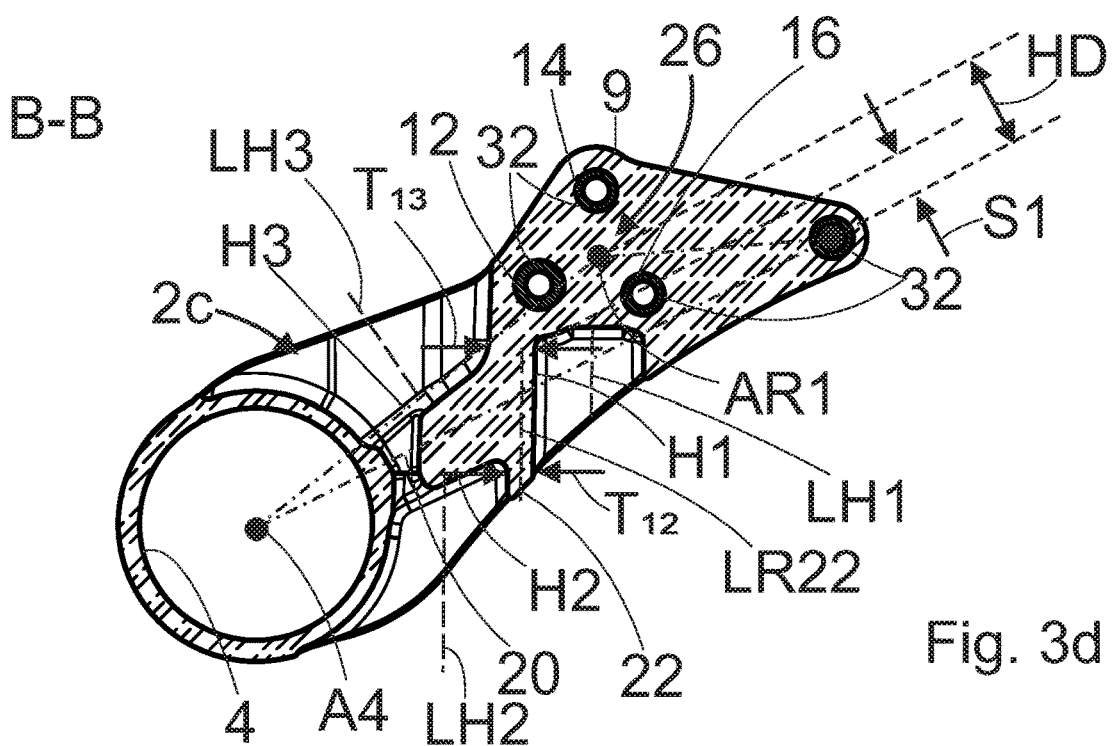
FIG. 3d shows a sectional view through the holding structure according to FIG. 3a along the line B-B according to FIG. 3b.

The first set of figures (FIGS. 1a, 1b1, 1b2, 1c, 1d, 1e, 1f) shows a holding structure 2a in a first embodiment in various views, which will be described overall below. FIGS. 1b1 and 1b2 are basically identical but show different sectional planes (A-A, B-B), which have not been shown in a FIG. 1b for reasons of clarity.

The holding structure 2a is formed as a casting and comprises four fixing sleeves 32. Each of the sleeves 32 has a through hole, through which a screw for fixing the holding structure 2a to an attachment structure, for example a vehicle frame structure, can be led. Each of the sleeves 32 defines a fixing point 12, 14, 16, 18 and has a central fixing axis A12, A14, A16, A18. The holding structure 2a additionally comprises two receiving eyes 4, 6, which each have a central receiving axis A4, A6. The fixing axes A12, A14, A16, A18 and the receiving axes A4, A6 run parallel to one another.

The holding structure 2a additionally comprises a first wall 8, which extends in a plane E8 or wall plane. It additionally comprises a second wall 10, which extends in a plane E10 or wall plane. The walls 8, 10 are arranged on the outside of the holding structure 2a and on opposite sides of the holding structure 2a; they can therefore also be designated as an outer wall. In the direction of the receiving axes A4, A6, the two walls 8, 10 are at a distance from each other. In their interspace, the holding structure 2a additionally comprises a centrally arranged inner wall 9, which extends in a plane E9 or wall plane, illustrated in the sectional view of FIG. 1f through this inner wall 9. The walls 8, 9, 10 and their planes E8, E9, E10 run parallel to one another. The fixing points 12, 14, 16, 18 are carried by the two walls 8, 10.

The receiving eyes 4, 6 extend continuously from the one wall 8 to the other wall 10 and through the walls 8, 9, 10. The receiving eyes 4, 6 are thus open at both ends. The fixing axes A12, A14, A16, A18 and the receiving axes A4, A6 run perpendicular to the planes E8, E9, E10.

The holding structure 2a now additionally comprises diverse cavities. A first group comprises cavities H1, H2, H3, H4, which can also be designated as wall cavities. The cavities H1, H2, H3, H4 are arranged between the walls 8, 10, each of these cavities H1, H2, H3, H4 being delimited by both walls 8, 10. Each of the cavities H1, H2, H3, H4 has along its course a longitudinal direction LH1, LH2, LH3, LH4, all of the longitudinal directions LH1, LH2, LH3, LH4 of the cavities H1, H2, H3, H4 running parallel to the walls 8, 10 and the inner wall 9. Each of the cavities H1, H2, H3, H4 is open to the surroundings of the holding structure 2a on at least one side, this open side not being located within a wall 8, 10 but instead in the intermediate region of the two walls 8, 10.

Formed between the two adjacent cavities H1, H4 is a funnel-shaped drain opening 20 from the inner wall 9, which connects the two cavities H1, H4 fluidically to each other.

The holding structure 2a additionally comprises a second group of cavities H5, which can be designated as traversing cavities. Each of the cavities H5 is delimited at the front by the inner wall 9 and on its opposite side is open towards the surroundings of the holding structure 2a, wherein this open side is located in the corresponding wall 8, 10. Each of the cavities H5 has along its course a longitudinal direction LH5, all the longitudinal directions LH5 running perpendicular to the walls 8, 10 and the inner wall 9. In addition, the longitudinal directions LH5 of the cavities H5 are aligned at right angles to the longitudinal directions LH1, LH2, LH3, LH4 of the cavities H1, H2, H3, H4. It can be seen that in each case two traversing cavities H5 are opposite with respect to the inner wall 9, for example to be seen in FIG. 1e.

Arranged between the walls 8, 10 are ribs 22, 23, 24 running in a straight line, which connect the two walls to each other indirectly but in a straight line in the axial direction via the inner wall 9. Each of the ribs 22, 23, 24 has a longitudinal direction LR22, LR23, LR24. It can be seen that each of the ribs 22, 23, 24 has a respective extent in the direction of the receiving axes A4, A6 which is greater than an extent in a direction which is transverse thereto and transverse to the longitudinal direction LR22, LR23, LR24 thereof. The ribs 23 can be designated as direct connecting ribs, since they directly connect force introduction points into receiving eyes 4, 6 and fixing points 12, 14, 16, 18 or fixing groups 26, 28. The direct connecting ribs thus extend between two of receiving eyes 4, 6, fixing points 12, 14, 16, 18 and fixing groups 26, 28.

In particular, FIG. 1c shows that the rib 24 separates the cavity H2, which can be a wall cavity, from a cavity H5, which can be a traversing cavity. Also to be seen there is the fact that the rib 22 extends in the direction of the fixing point 12 and the rib 24 extends in the direction of the fixing point 16.

FIG. 1f now shows diverse geometric relationships in the holding structure 2a. The fixing points 12, 14 and 16 define a fixing group 26. The respective fixing axes A12, A14 and A16 yield a resultant fixing axis AR1 as a mathematical center of gravity of a triangle formed by the fixing axes A12, A14 and A16. Intellectually, a connecting triangle D can then be spanned between the resulting fixing axis AR1, the receiving axis A4 and the receiving axis A6. The connecting triangle D has three sides.

It can be seen that each of the cavities H1, H2, H3, H4 projects into the connecting triangle D, each penetration direction S1, S2, S3, S4 being perpendicular to the receiving axes A4, A6. The penetration distances S1, S2, S3, S4 along the respective longitudinal direction LH1, LH2, LH3, LH4 into the connecting triangle D have different lengths, wherein the cavity H2 projects furthest into the connecting triangle D. The penetration distance S2 of the cavity H2 here is approximately 0.8 times the height HD of the connecting triangle D beyond the side through which the cavity H2 projects. The cavities H5 do not project into this connecting triangle D, since they traverse none of the sides of the connecting triangle D.

In the combined view of FIGS. 1c and 1f it can be seen that the rib 22 within the connecting triangle D separates a cavity H5 and the cavity H1 from the cavity H2 and, outside the connecting triangle D, separates the cavity H1 from the cavity H2. In the combined view of FIGS. 1c and 1f it can be seen that the rib 24 separates the cavities H2 and H3 both inside and also outside the connecting triangle D. It can additionally be seen that the ribs 22, 24 project beyond the longest of the three sides of the connecting triangle D.

To avoid repetitions, only the basic differences of the second figure set (FIGS. 2a, 2b, 2c, 2d) from the first figure set will be described below. Features that are not described are intended equally to count as disclosed and described.

The second figure set (FIGS. 2a, 2b, 2c, 2d) shows a holding structure 2b in a second embodiment in various views, which will be described overall below.

The holding structure 2b now comprises a single receiving eye 4 with receiving axis A4. Although there are still four fixing points 12, 14, 16, 18, they are arranged differently. The first two fixing points 12 and 14 define the first fixing group 26 with a resultant fixing axis AR1, and the two other fixing points 16 and 18 now define a further fixing group 28 with resultant fixing axis AR2. The resultant geometric center for the resulting fixing axis AR2 is the center of a connecting straight line between the exactly two fixing axes A16, A18. Thus, the connecting triangle D is formed between the fixing axes AR1, AR2 and the receiving axis A4.

The holding structure 2b now has only three cavities H1, H2, H3 or wall cavities and only one pair of cavities H5 or traversing cavities located opposite with respect to the inner wall 9. The drain opening 20 is formed between the cavities H1 and H3. The two cavities H1, H3 are separated by the rib 22 inside and outside the connecting triangle D. The penetration distances S1, S2 of the cavities H1, H2 are now approximately equally long, the cavity H2 penetrating furthest, by approximately half the height HD of the connecting triangle D.

To avoid repetitions, only the basic differences of the third figure set (FIGS. 3a, 3b, 3c, 3d) from the first figure set will be described below. Features that are not described are intended equally to count as disclosed and described.

The third figure set (FIGS. 3a, 3b, 3c, 3d) shows a holding structure 2c in a third embodiment in various views, which will be described overall below.

The holding structure 2c now comprises a single receiving eye 4 with receiving axis A4. Although there are still four fixing points 12, 14, 16, 18, of which the fixing points 12, 14 and 16 continue to form the first fixing group 26 with resultant fixing axis AR1, the receiving axis A4, the fixing axis AR1 and the fixing axis A18 are arranged relative to one another such that when these three axes A4, A18, AR1 are connected, a quite flat connecting triangle D with a low height HD results.

The holding structure 2c now has only three cavities H1, H2, H3 or wall cavities and four pairs of cavities H5 or traversing cavities located opposite with respect to the inner wall 9. The drain opening 20 is formed between the cavities H2 and H3. The cavity H1 has the longest penetration distance S1, S1 being approximately half the height HD of the connecting triangle D.

The invention is not restricted to one of the above-described embodiments but can be modified in many ways. All the features and advantages emerging from the claims, the description, and the drawing, including constructional details, spatial arrangements and method steps, can be important to the invention both on their own and also in an extremely wide range of combinations.

All combinations of at least two of the features disclosed in the description, the claims and/or the figures fall within the scope of the invention.

To avoid repetitions, features disclosed in relation to the device are also intended to apply and be able to be claimed as disclosed in relation to the method. Likewise, features disclosed in relation to the method are intended to apply and be able to be claimed as disclosed in relation to the device.

The invention claimed is:
1. A holding structure, comprising:
at least one receiving eye having a central receiving axis,
at least two fixing points which each have a central fixing axis that runs parallel to the at least one receiving axis,
a first wall and a second wall provided on opposite sides of the holding structure,
wherein the first wall and the second wall are spaced apart in a direction of the at least one receiving axis; the at least one receiving eye extends from one of the first wall and the second wall to the other wall; the holding structure has at least one cavity provided between the first wall and the second wall; three axes, selected from the group comprising receiving axis/axes, fixing axes, and resultant fixing axis, define at least one connecting triangle, and the at least one cavity projects into the at least one connecting triangle.
2. The holding structure as claimed in claim 1, wherein at least one rib is provided between the first wall and the second wall.

3. A holding structure, comprising:
at least one receiving eye having a central receiving axis,
at least two fixing points which each have a central fixing axis that runs parallel to the at least one receiving axis,
a first wall and a second wall provided on opposite sides of the holding structure,
wherein the first wall and the second wall are spaced apart in a direction of the at least one receiving axis; the at least one receiving eye extends from one of the first wall and the second wall to the other wall; the holding structure has at least one cavity provided between the first wall and the second wall; and at least one of the at least two fixing points is carried by the first wall and the second wall.

4. The holding structure as claimed in claim 1, wherein the at least one cavity projects in a direction that is perpendicular to the at least one receiving axis.

5. The holding structure as claimed in claim 1, wherein a penetration distance over which the at least one cavity projects into the connecting triangle is 1.0 times to 0.1 times a height of the connecting triangle.

6. The holding structure as claimed in claim 1, wherein a penetration distance over which the at least one cavity projects into the connecting triangle is 0.9 times to 0.1 times a height of the connecting triangle.

7. The holding structure as claimed in claim 3, wherein three axes, selected from the group comprising receiving axis/axes, fixing axes, and resultant fixing axis, define at least one connecting triangle, wherein the at least one cavity projects into the at least one connecting triangle.

8. The holding structure as claimed in claim 1, wherein a majority of the fixing points are carried by the first wall and the second wall.

9. The holding structure as claimed in claim 1, wherein all of the at least two fixing points are carried by the first wall and the second wall.

10. A holding structure, comprising:
at least one receiving eye having a central receiving axis,
at least two fixing points which each have a central fixing axis that runs parallel to the at least one receiving axis,
a first wall and a second wall provided on opposite sides of the holding structure, wherein the first wall and the second wall are spaced apart in a direction of the at least one receiving axis; the at least one receiving eye extends from one of the first wall and the second wall to the other wall; the holding structure has at least one cavity provided between the first wall and the second wall; and at least one drain opening is fluidically connected to at least one cavity and leads to a surroundings of the holding structure or to another cavity.

11. The holding structure as claimed in claim 2, wherein the at least one rib separates at least two of the cavities in an interior of a connecting triangle and separates at least two of the cavities outside the connecting triangle, or the at least one rib separates two of the cavities in the interior of the connecting triangle and outside the connecting triangle.

12. The holding structure as claimed in claim 2, wherein the at least one rib projects beyond a longest side of a connecting triangle.

13. The holding structure as claimed in claim 2, wherein the at least one rib extends in a direction of one of the fixing points or of a fixing group formed by fixing points.

14. The holding structure as claimed in claim 1, wherein the holding structure is formed in one piece.

15. The holding structure as claimed in claim 1, wherein the holding structure is formed as a casting.

16. The holding structure as claimed in claim 3, wherein at least one drain opening is fluidically connected to at least one cavity and leads to a surroundings of the holding structure or to another cavity.

17. The holding structure as claimed in claim 3, wherein at least one rib is provided between the first wall and the second wall; and the at least one rib separates at least two of the cavities in an interior of a connecting triangle and separates at least two of the cavities outside the connecting triangle, or the at least one rib separates two of the cavities in the interior of the connecting triangle and outside the connecting triangle.

18. The holding structure as claimed in claim 3, wherein at least one rib is provided between the first wall and the second wall; and the at least one rib projects beyond a longest side of a connecting triangle.

19. The holding structure as claimed in claim 3, wherein at least one rib is provided;
and the at least one rib extends in a direction of one of the fixing points or of a fixing group formed by fixing points.

20. The holding structure as claimed in claim 3, wherein the holding structure is formed as a casting.

* * * * *